US008665938B2

(12) United States Patent
Yu et al.

(10) Patent No.: US 8,665,938 B2
(45) Date of Patent: Mar. 4, 2014

(54) WIRELESS TRANSMISSION APPARATUS AND SELF-CHECKING METHOD OF WIRELESS TRANSMISSION APPARATUS (71) Applicant: Huawei Technologies Co., Ltd., Guangdong (CN)

(72) Inventors: Guobin Yu, Chengdu (CN); Hongyong Lin, Chengdu (CN); Yicai Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/685,098

(22) Filed: Nov. 26, 2012

(65) Prior Publication Data

US 2013/0077665 A1 Mar. 28, 2013

Related U.S. Application Data

(63) Continuation of application No. PCT/CN2011/072083, filed on Mar. 23, 2011.

(30) Foreign Application Priority Data

Aug. 16, 2010 (CN) .......................... 2010 1 0254178

(51) Int. Cl.
*H04B 3/46* (2006.01)
*H04B 17/00* (2006.01)
*H04Q 1/20* (2006.01)

(52) U.S. Cl.
USPC ........... 375/228; 375/220; 375/221; 375/225; 375/226; 375/227

(58) Field of Classification Search
USPC ................................ 375/219–228
See application file for complete search history.

(56) References Cited

U.S. PATENT DOCUMENTS 5,835,850 A * 11/1998 Kumar ...................... 455/67.14
7,158,586 B2 * 1/2007 Husted ......................... 375/324
(Continued)

FOREIGN PATENT DOCUMENTS

CN  1176539 A   3/1998
CN  2819658 Y   9/2006
(Continued)

OTHER PUBLICATIONS

International Search Report dated Jun. 30, 2011 in connection with International Patent Application No. PCT/CN2011/072083.

(Continued)

*Primary Examiner* — Sam K Ahn
*Assistant Examiner* — James M Perez (57) ABSTRACT

A wireless transmission apparatus includes a service processing unit, a duplexer, a radio frequency receiving unit, a frequency synthesizer, and a controller. The controller controls, according to a reduced TR interval, the frequency synthesizer to adjust a frequency of a local oscillation signal which is output by the frequency synthesizer to the radio frequency receiving unit. The service processing unit continues to send a service signal as a self-checking signal, and a part of the self-checking signal leaks into the radio frequency receiving unit through the duplexer. After the radio frequency receiving unit mixes a received signal with the local oscillation signal, a frequency of the self-checking signal included in an output signal falls within a pass-band range of an intermediate frequency receiving unit, which ensures that the self-checking signal can be looped back to the service processing unit, thereby determines whether a fault occurs in its own transmission channel.

12 Claims, 3 Drawing Sheets

(56) References Cited

U.S. PATENT DOCUMENTS

| | | | |
|---|---|---|---|
| 7,248,625 B2* | 7/2007 | Chien | 375/219 |
| 7,733,949 B2* | 6/2010 | Jin et al. | 375/221 |
| 8,284,824 B1* | 10/2012 | Smaini et al. | 375/221 |
| 2003/0171110 A1* | 9/2003 | Shi et al. | 455/324 |
| 2006/0034356 A1* | 2/2006 | Fechtel | 375/219 |
| 2006/0035601 A1* | 2/2006 | Seo | 455/78 |
| 2006/0215744 A1* | 9/2006 | O'Neill | 375/224 |
| 2006/0217085 A1 | 9/2006 | Eisenstadt et al. | |
| 2007/0047634 A1* | 3/2007 | Kang et al. | 375/226 |
| 2007/0123188 A1* | 5/2007 | Mo et al. | 455/302 |
| 2010/0120369 A1* | 5/2010 | Ko et al. | 455/67.11 |
| 2010/0177811 A1* | 7/2010 | Duerdodt et al. | 375/224 |
| 2011/0026570 A1* | 2/2011 | Feng et al. | 375/224 |

FOREIGN PATENT DOCUMENTS

| | | |
|---|---|---|
| CN | 201044447 Y | 4/2008 |
| CN | 100403685 C | 7/2008 |
| CN | 101252368 A | 8/2008 |
| CN | 201150060 Y | 11/2008 |
| CN | 101478320 A | 7/2009 |
| CN | 101801122 A | 8/2010 |
| CN | 101908994 A | 12/2010 |
| EP | 1 351 418 A2 | 10/2003 |
| EP | 2 458 792 A1 | 5/2012 |
| WO | WO 2007/043752 A1 | 4/2007 |
| WO | WO 2011/079765 A1 | 7/2011 |

OTHER PUBLICATIONS

Partial Translation of Search Report in connection with Chinese Patent Application No. 201010254178.0 dated Feb. 13, 2012.

Translation of Office Action dated Feb. 13, 2012 in connection with Chinese Patent Application No. 201010254178.0.

Supplementary European Search Report dated Apr. 24, 2012 in connection with European Patent Application No. EP 11 75 2854.

Partial Translation of Office Action in connection with Chinese Patent Application No. 201010254178.0.

* cited by examiner

FIG. 3

WIRELESS TRANSMISSION APPARATUS AND SELF-CHECKING METHOD OF WIRELESS TRANSMISSION APPARATUS

CROSS-REFERENCE TO RELATED APPLICATIONS

This application is a continuation of International Application No. PCT/CN2011/072083, filed on Mar. 23, 2011, which claims priority to Chinese Patent Application No. 201010254178.0, filed on Aug. 16, 2010, both of which are hereby incorporated by reference in its entirety.

TECHNICAL FIELD

The present invention relates to the field of communication transmission, and in particular, to a wireless transmission apparatus and a self-checking method of the wireless transmission apparatus.

BACKGROUND

Due to the requirements of application scenarios, a wireless transmission apparatus needs to be installed on a roof or tall tower and needs treatments such as waterproofing, so the installation and disassembly is complex. When a system fault occurs in the wireless transmission apparatus, to reduce operations of disassembling and installing the wireless transmission apparatus, the wireless transmission apparatus usually needs to have an independent loopback channel established inside or a loopback device externally connected to perform self-checking. However, the inside establishment of the independent loopback channel in the wireless transmission apparatus increases additional cost and design complexity, and the external connection of the loopback device requires engineering personnel to work on site and has poor operability.

SUMMARY

Embodiments of the present invention provide a wireless transmission apparatus and a self-checking method of the wireless transmission apparatus, where the wireless transmission apparatus locates a fault by looping back a service signal.

A wireless transmission apparatus includes a service processing unit, a duplexer, a radio frequency receiving unit, a frequency synthesizer, and a controller. The controller starts a self-checking function, reduces a TR interval into a preset range, and controls, according to the reduced TR interval, the frequency synthesizer to adjust a frequency of a local oscillation signal which is output by the frequency synthesizer to the radio frequency receiving unit. The service processing unit continues to send a service signal as a self-checking signal, and after the self-checking signal is modulated into a radio frequency signal, a part of the self-checking signal leaks into the radio frequency receiving unit through the duplexer. After the radio frequency receiving unit mixes a received signal with the local oscillation signal, a frequency of the self-checking signal included in an output signal falls within a pass-band range of an intermediate frequency receiving unit.

A self-checking method of a wireless transmission apparatus includes: starting a self-checking function and reducing a TR interval into a preset range; controlling, according to the reduced TR interval, a frequency synthesizer to adjust a frequency of a local oscillation signal which is output by the frequency synthesizer to a radio frequency receiving unit; controlling a service processing unit to continue to send a service signal as a self-checking signal; modulating the self-checking signal into a radio frequency signal, where a part of the self-checking signal leaks into the radio frequency receiving unit through a duplexer; and controlling the radio frequency receiving unit to mix a received signal with the local oscillation signal, where a frequency of the self-checking signal included in an output signal falls within a pass-band range of an intermediate frequency receiving unit.

The wireless transmission apparatus reduces a frequency interval for receiving and transmitting signals, and controls, according to the reduced frequency interval, the frequency synthesizer to adjust the frequency of the local oscillation signal which is output by the frequency synthesizer to the radio frequency receiving unit, so that the frequency after the self-checking signal leaking through the duplexer is mixed with the local oscillation signal falls within the pass-band range of the intermediate frequency receiving unit, which ensures that the self-checking signal can be looped back to the service processing unit, and thereby determines whether a fault occurs in a transmission channel of the wireless transmission apparatus.

BRIEF DESCRIPTION OF THE DRAWINGS

The following accompanying drawings are used for understanding embodiments of the present invention, and do not constitute a limitation of the present invention.

DETAILED DESCRIPTION

To enable persons of ordinary skill in the art to understand and implement the present invention, embodiments of the present invention are described with reference to the accompanying drawings. Here, the exemplary embodiments of the present invention and the illustration thereof are used for explaining the present invention, but not intended to limit the present invention.

Figure 1:
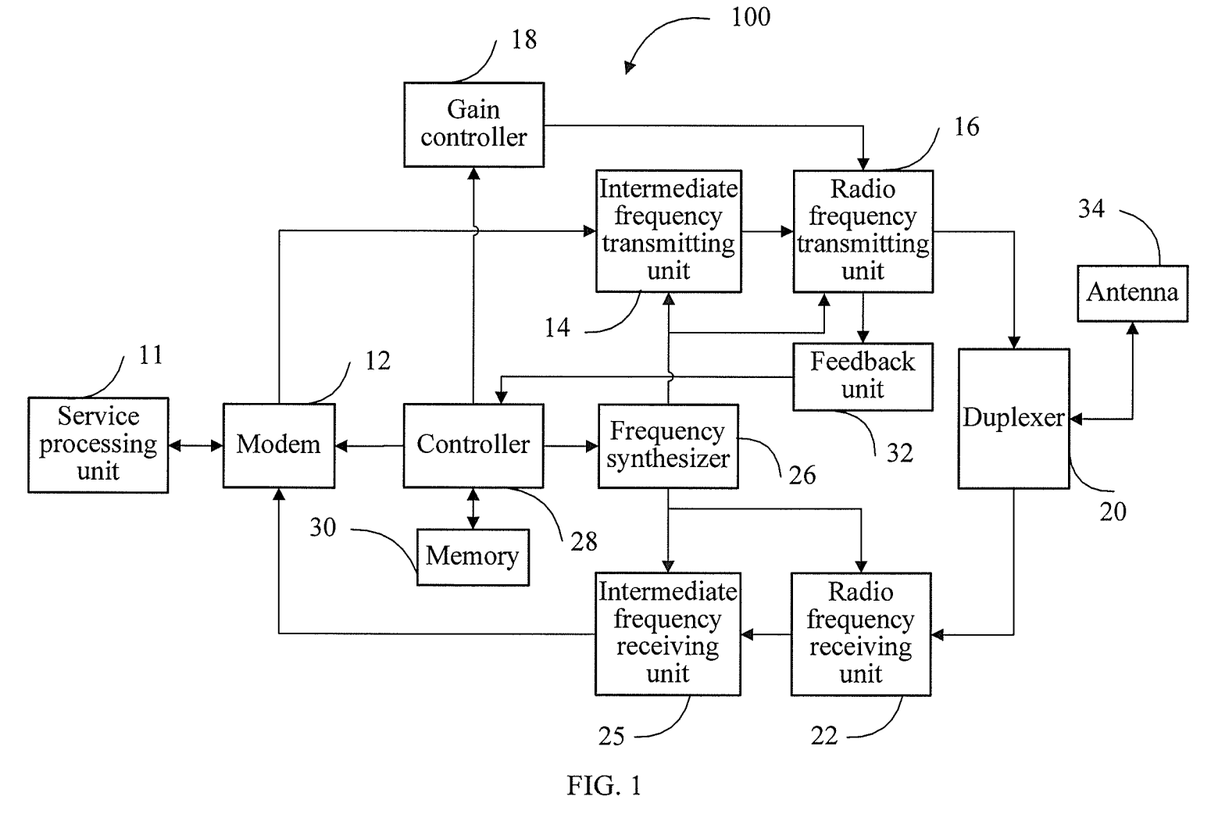
FIG. 1 is a schematic diagram of a functional architecture of a wireless transmission apparatus according to Embodiment 1 of the present invention, where all functional units of the wireless transmission apparatus are integrated.

As shown in FIG. 1 is a schematic diagram of a functional architecture of a wireless transmission apparatus 100 according to Embodiment 1 of the present invention. All functional units of the wireless transmission apparatus 100 are integrated, including a service processing unit 11, a modem (MODEM) 12, an intermediate frequency transmitting unit 14, a radio frequency transmitting unit 16, a duplexer 20, a radio frequency receiving unit 22, and an intermediate frequency receiving unit 25, which are all connected in turn. The intermediate frequency receiving unit 25 is further coupled with the modem 12.

The wireless transmission apparatus 100 further includes a gain controller 18, a frequency synthesizer (frequency synthesizer) 26, a controller 28, a memory 30, and a feedback unit 32. The frequency synthesizer 26 is connected to the intermediate frequency transmitting unit 14, the radio frequency transmitting unit 16, the radio frequency receiving unit 22, and the intermediate frequency receiving unit 25. The modem 12, the intermediate frequency transmitting unit 14, and the radio frequency transmitting unit 16 constitute a transmitting channel of the wireless transmission apparatus 100; the radio frequency receiving unit 22, the intermediate frequency receiving unit 25, and the modem 12 constitute a receiving channel of the wireless transmission apparatus 100.

The memory 30 is connected to the controller 28 and stores various parameter values of the wireless transmission apparatus 100. The parameter values include a frequency interval for receiving and transmitting signals (hereinafter referred to as a TR interval), a modulation mode of the modem 12, and a rated maximum transmit power of a radio frequency signal output by the radio frequency transmitting unit 16.

The frequency synthesizer 26 is configured to generate a local oscillation signal, and the intermediate frequency transmitting unit 14, the radio frequency transmitting unit 16, the radio frequency receiving unit 22, and the intermediate frequency receiving unit 25 mix received and transmitted signals with the local oscillation signal. To distinguish different local oscillation signals, a local oscillation signal provided by the frequency synthesizer 26 for the intermediate frequency transmitting unit 14 and the intermediate frequency receiving unit 25 is referred to as a first local oscillation signal, a local oscillation signal provided by the frequency synthesizer 26 for the radio frequency transmitting unit 16 is referred to as a second local oscillation signal, and a local oscillation signal provided by the frequency synthesizer 26 for the radio frequency receiving unit 22 is referred to as a third local oscillation signal. Frequencies of the first local oscillation signal and the second local oscillation signal have been fixed in design, and cannot be adjusted by the frequency synthesizer 26 according to a change of the TR interval. However, the frequency synthesizer 26 may adjust a frequency of the third local oscillation signal according to the change of the TR interval.

According to the preset modulation mode, the modem 12 modulates a service signal sent by the service processing unit 11 into a first intermediate frequency signal, or demodulates a received second intermediate frequency signal into a service signal and transfers the service signal to the service processing unit 11.

The intermediate frequency transmitting unit 14 mixes the received first intermediate frequency signal with the first local oscillation signal and then outputs a first intermediate-to-high frequency signal.

The radio frequency transmitting unit 16 mixes the received first intermediate-to-high frequency signal with the second local oscillation signal and then outputs a radio frequency signal, adjusts a power of the radio frequency signal, and then transmits the radio frequency signal through the duplexer 20 and an antenna 34.

The duplexer 20 is formed by two filters of different frequencies, and is configured to isolate a transmitted signal and a received signal, so as to avoid transmission of the transmitted signal to the receiving channel of the local end, and ensure that signal receiving and transmission can be performed normally. The duplexer 20 is further coupled with an antenna 32.

The radio frequency receiving unit 22 mixes a received signal with the third local oscillation signal, and outputs a second intermediate-to-high frequency signal. The signal received by the radio frequency receiving unit 22 includes the radio frequency signal leaking through the duplexer 20 and a signal sent by a peer end.

The intermediate frequency receiving unit 25 has a pass-band range centered about a certain frequency, and is configured to filter the second intermediate-to-high frequency signal output by the radio frequency receiving unit 22, and filter out noise signal falling beyond the pass-band range, so as to reduce interference generated by the noise signal; and mix the filtered second intermediate-to-high frequency signal with the first local oscillation signal and then output a second intermediate frequency signal.

The controller 28 is configured to control the modem 12, the gain controller 18, and the frequency synthesizer 26 to work. For example, the controller 28 controls the modem 12 to set the modulation mode, controls, according to the TR interval, the frequency synthesizer 26 to adjust the frequency of the third local oscillation signal, and controls, through the gain controller 18, the power of the radio frequency signal output by the radio frequency transmitting unit 16.

The feedback unit 32 is connected between the radio frequency transmitting unit 16 and the controller 28, and feeds the radio frequency signal back to the controller 28, and the controller 28 compares the power of the fed back radio frequency signal with a preset power, and determines whether it is necessary to further control, through the gain controller 18, the radio frequency transmitting unit 16 to adjust the power of the radio frequency signal.

In the technical solution of the present invention, when testing whether a fault occurs in the wireless transmission apparatus 100, the controller 28 starts a self-checking function, reduces the TR interval into a preset range, and controls, according to the reduced TR interval, the frequency synthesizer 26 to adjust the frequency of the third local oscillation signal. Preferably, the preset range is from 0 Hz to 10 KHz. The service processing unit 11 continues to send a service signal as a self-checking signal.

It should be noted that, the controller 28 cannot control, according to the reduced TR interval, the frequency synthesizer 26 to adjust the frequencies of the first local oscillation signal and the second local oscillation signal.

The controller 28 controls the modem 12, the intermediate frequency transmitting unit 14, and the radio frequency transmitting unit 16 to modulate the self-checking signal. After the self-checking signal is modulated into a radio frequency signal through the radio frequency transmitting unit 16, a part of the self-checking signal leaks into the radio frequency receiving unit 22 through the duplexer 20.

The radio frequency receiving unit 22 mixes a received signal with the third local oscillation signal, and outputs a second intermediate-to-high frequency signal. The frequency of the self-checking signal included in the second intermediate-to-high frequency signal falls within the pass-band range of the intermediate frequency receiving unit 25, so that the self-checking signal may be transferred to the modem 12 through the intermediate frequency receiving unit 25.

It should be noted that, even if the received signal includes a signal sent by the peer end, after the radio frequency receiving unit 22 mixes the received signal with the third local oscillation signal, the frequency of the signal sent by the peer end falls beyond the pass-band range of the intermediate frequency receiving unit 25, so that the signal sent by the peer end is filtered out by the intermediate frequency receiving unit 25, which avoids interference of the signal sent by the peer end with the self-checking signal.

The intermediate frequency receiving unit 25 filters and modulates the second intermediate-to-high frequency signal output by the radio frequency receiving unit 22, so as to output a second intermediate frequency signal.

The modem 12 demodulates the second intermediate frequency signal, which is output by the intermediate frequency receiving unit 22, into a service signal.

The service processing unit 11 determines whether the service signal received by the service processing unit 11 includes the self-checking signal, and if the service processing unit 11 determines that the service signal received by the service processing unit 11 does not include the self-checking signal, it indicates that the transmission channel in the wireless transmission apparatus 100 is blocked, which thereby reminds network management personnel to further check the specific cause of the fault; if the service processing unit 11 determines that the service signal received by the service processing unit 11 includes the self-checking signal, it indicates that the transmission channel in the wireless transmission apparatus 100 is unblocked, which thereby reminds the network management personnel to further test whether a transmission channel and a communication link of the peer end are unblocked.

Further, the service processing unit 11 may further determine whether a bit error rate of the self-checking signal received by the service processing unit 11 goes beyond a normal range, and if the service processing unit 11 determines that the bit error rate of the self-checking signal received by the service processing unit 11 goes beyond the normal range, it indicates that the transmission channel in the wireless transmission apparatus 100 is unblocked but faulty, which reminds the network management personnel to further check the specific cause of the fault; if the service processing unit 11 determines that the bit error rate of the self-checking signal received by the service processing unit 11 is in the normal range, it indicates that the transmission channel in the wireless transmission apparatus 100 is unblocked and faultless, which reminds the network management personnel to further test whether the transmission channel and the communication link of the peer end are faulty.

Moreover, the controller 28 may further control the modem 12 to be set in a modulation mode with a modulation order which is not higher than 7, such as, QPSK, 16QAM, or 64QAM, so as to reduce the sensitivity of the modem 12 and ensure that the modem 12 can correctly demodulate the self-checking signal.

Furthermore, the controller 28 may further control, through the gain controller 18, the radio frequency transmitting unit 16 to increase the power of the self-checking signal output by the radio frequency transmitting unit 16, for example, to increase the power of the self-checking signal to a rated maximum transmit power, so as to increase a signal-to-noise ratio of the self-checking signal leaking through the duplexer 20, and satisfy the requirement of the modem 12 for the signal-to-noise ratio for signal demodulation.

The technical solution that the self-checking signal sent by the service processing unit 11 can be looped back by setting relevant parameters of the wireless transmission apparatus 100 in Embodiment 1 of the present invention is illustrated below with an example.

In Embodiment 1, the wireless transmission apparatus 100 sets the following parameter values: A transmit power of the self-checking signal output by the radio frequency transmitting unit 16 is 12 dBm, the TR interval is 196 MHz, the isolation of the duplexer is 70 dB, the pass-band range of the intermediate frequency receiving unit 25 is 2.14 GHz±50 MHz, a service bandwidth is 28 MHz, a system noise figure ($NF_{sys}$) is 5 dB, the modulation mode of the modem 12 is set to 256QAM; in addition, the frequency of the self-checking signal modulated by the modem 12 is 0.35 GHz, the frequency of the first local oscillation signal which is provided by the frequency synthesizer 26 for the intermediate frequency transmitting unit 14 is 2 GHz, the frequency of the second local oscillation signal provided for the radio frequency transmitting unit 16 is 5 GHz, and the frequency of the third local oscillation signal provided for the radio frequency receiving unit 22 is 5.406 GHz. The following results may be obtained through calculation.

The frequency after the intermediate frequency transmitting unit 14 mixes the self-checking signal (having a frequency of 0.35 GHz) modulated by the modem 12 with the first local oscillation signal (having a frequency of 2 GHz) is 2.35 GHz.

The frequency after the radio frequency transmitting unit 16 mixes the self-checking signal (having a frequency of 2.35 GHz) modulated by the intermediate frequency transmitting unit 14 with the second local oscillation signal (having a frequency of 5 GHz) is 7.35 GHz.

The frequency after the radio frequency receiving unit 22 mixes the self-checking signal (having a frequency of 7.35 GHz) leaking through the duplexer 20 with the third local oscillation signal (having a frequency of 5.406 GHz) is 1.944 GHz.

A frequency of a signal received by the radio frequency receiving unit 22 from a peer end is 7.546 GHz, equal to the frequency (7.35 GHz) of the radio frequency signal of the local end plus a TR interval (0.196 GHz).

The frequency after the radio frequency receiving unit 22 mixes the signal (having a frequency of 7.546 GHz) received from the peer end with the third local oscillation signal (having a frequency of 5.406 GHz) is 2.14 GHz.

It can be known that, when the wireless transmission apparatus 100 works normally, the signal that is received from the peer end and mixed by the radio frequency receiving unit 22 (to have a frequency of 2.14 GHz) falls within the pass-band range (2.14 GHz±50 MHz) of the intermediate frequency receiving unit 25, and therefore is not filtered out by the intermediate frequency receiving unit 25. However, the self-checking signal mixed by the radio frequency receiving unit 22 (to have a frequency of 1.944 GHz) falls beyond the pass-band range (2.14 GHz±50 MHz) of the intermediate frequency receiving unit 25, and therefore is filtered out by the intermediate frequency receiving unit 25 and cannot be looped back to the service processing unit 11.

When the service processing unit 11 fails to receive the service signal or the bit error rate of the received service signal goes beyond the normal range, the controller 28 starts the self-checking function and reduces the TR interval to 0. Accordingly, the controller 28 controls, according to the reduced TR interval, the frequency synthesizer 26 to adjust the frequency of the third local oscillation signal, and the frequency of the third local oscillation signal (hereinafter referred to as a fourth local oscillation signal) is 5.21 GHz.

Based on the above, the frequency after the radio frequency receiving unit 22 mixes the self-checking signal (having a frequency of 7.35 GHz) leaking through the duplexer 20 with the fourth local oscillation signal (having a frequency of 5.21 GHz) is 2.14 GHz, which falls within the pass-band range (2.14 GHz±50 MHz) of the intermediate frequency receiving unit 25; therefore, the self-checking signal is not filtered out by the intermediate frequency receiving unit 25 and can be looped back to the service processing unit 11.

It should be noted that, even if the radio frequency receiving unit 22 can receive the signal sent by the peer end, the frequency after the signal (having a frequency of 7.546 GHz) sent by the peer end is mixed with the fourth local oscillation signal (having a frequency of 5.21 GHz) is 2.336 GHz, which falls beyond the pass-band range (2.14 GHz±50 MHz) of the intermediate frequency receiving unit 25; therefore, the signal sent by the peer end is filtered out by the intermediate frequency receiving unit 25, so that interference of the signal sent by the peer end with the self-checking signal is avoided and it is ensured that the self-checking signal can be looped back to the service processing unit 11.

Further, only when the signal-to-noise ratio of the self-checking signal sent to the modem 12 is not smaller than a minimum signal-to-noise ratio for correct demodulation of the modem 12, the modem 12 can correctly demodulate the self-checking signal. Since the receiving channel of the wireless transmission apparatus 100 deteriorates the self-checking signal to a fixed degree, whether the self-checking signal can be correctly demodulated by the modem 12 may be determined according to the signal-to-noise ratio of the self-checking signal leaking through the duplexer 20.

In addition, the greater the power of the self-checking signal output by the radio frequency transmitting unit 16 is, the greater the signal-to-noise ratio of the self-checking signal leaking through the duplexer 20 is. Therefore, a difference between the power of the self-checking signal leaking through the duplexer 20 and the sensitivity of the modem 12 may be used to determine whether the modem 12 can correctly demodulate the self-checking signal.

For example, when the modulation mode is set to 256QAM, the minimum signal-to-noise ratio for correct demodulation of the modem 12 is 17.7 dB. In addition, the power of the self-checking signal leaking through the duplexer 20 is: 12 dBm−70 dBm=−58 dBm.

Based on the above parameter values, the sensitivity of the modem 12 calculated according to a calculation formula of sensitivity is −65.5 dBm. Specifically, sensitivity (dBm)=−174+10 lg(B)+NF$_{sys}$+S/N=−174+10*lg(28*10$^6$)+5+17.7=−174+86.8 (omitted value)+5+17.7=−65.5 dBm. Since the difference between the power (−58 dBm) of the self-checking signal and the sensitivity (−65.5 dBm) of the modem is smaller than 10 dBm, the modem 12 may generate a residual bit error, thereby incapable of correctly demodulating the self-checking signal.

In Embodiment 1, the difference between the power of the self-checking signal and the sensitivity of the modem 12 may be increased in the following two manners: the first manner is to lower the sensitivity of the modem 12, and the second manner is to raise the power of the self-checking signal. The two manners are illustrated below with an example.

In the first manner, since the lower the modulation order of the modulation mode is, the lower the minimum signal-to-noise ratio for correction demodulation of the modem 12 is, so the controller 28 sets the modulation mode of the modem 12 to QPSK with a modulation order of 2, and accordingly, the minimum signal-to-noise ratio for correction demodulation of the modem 12 is −2.3 dB. The sensitivity of the modem 12 calculated according to the calculation formula of sensitivity is −85.5 dBm.

In the second manner, the controller 28 controls, through the gain controller 18, the radio frequency transmitting unit 16 to increase the power of the self-checking signal output by the radio frequency transmitting unit 16, for example, to increase the power of the self-checking signal, which is output by the radio frequency transmitting unit 16, to a rated maximum transmit power (20 dBm). Therefore, the power of the self-checking signal leaking through the duplexer 20 is: 20 dBm−70 dBm=−50 dBm.

It can be known that, the difference between the power of the self-checking signal leaking through the duplexer 20 and the sensitivity of the modem 12 is greater than 10 dBm in either of the above manners, so that the possibility that the modem 12 generates a residual bit error is reduced and it is ensured that the modem 12 can correctly demodulate the self-checking signal, so that the self-checking signal can be looped back to the service processing unit 11.

Figure 2:
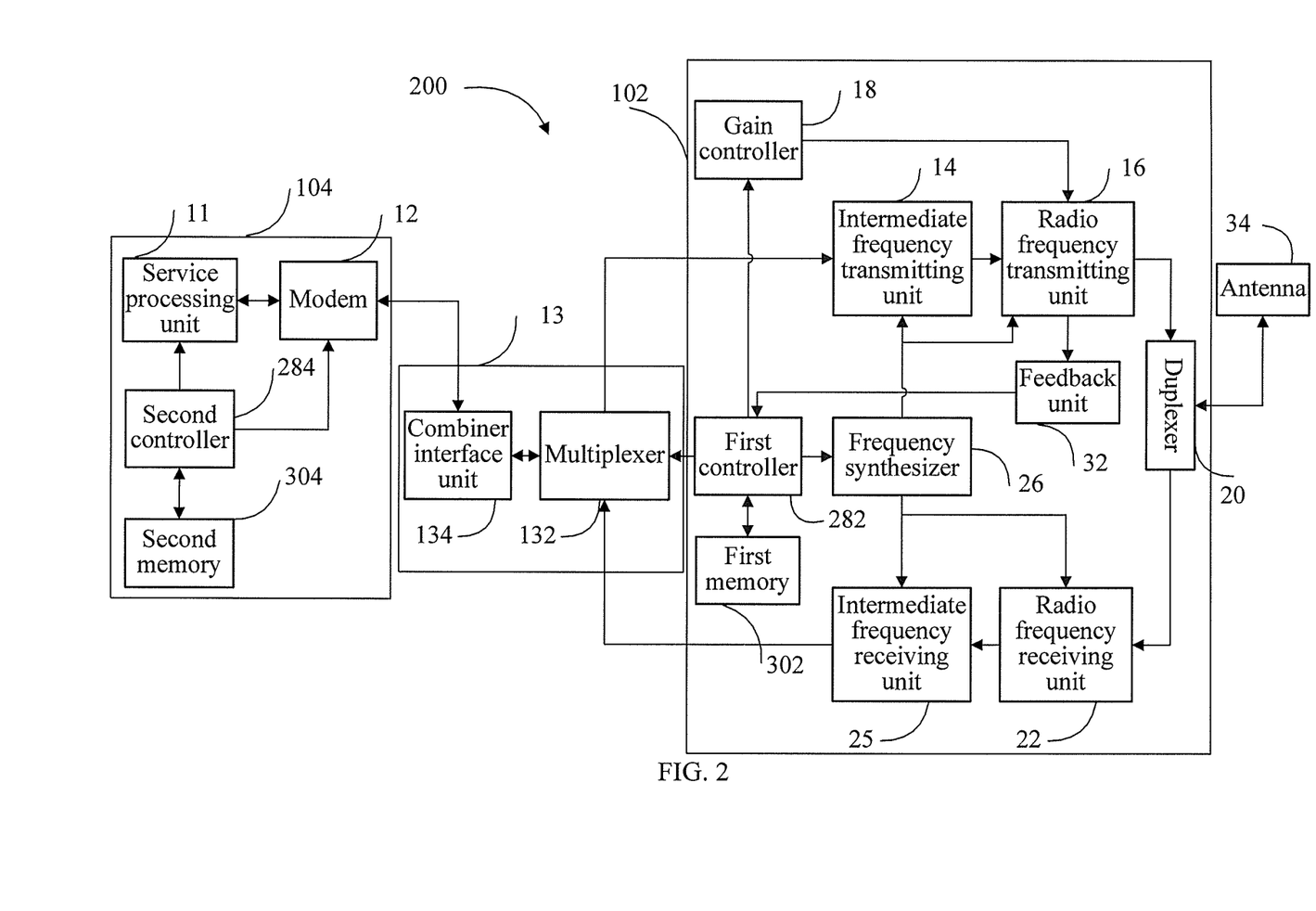
FIG. 2 is a schematic diagram of a functional architecture of a wireless transmission apparatus according to Embodiment 2 of the present invention, where all functional units of the wireless transmission apparatus are divided into two parts, namely, an outdoor device and an indoor device, and the outdoor device and the indoor device are connected to each other through an interface unit.

As shown in FIG. 2, it is a schematic diagram of a functional architecture of a wireless transmission apparatus 200 according to Embodiment 2 of the present invention. For ease of installation, all functional units in the wireless transmission apparatus 100 are usually divided into two parts, namely, an outdoor device 102 and an indoor device 104. The outdoor device 102 includes an intermediate frequency transmitting unit 14, a radio frequency transmitting unit 16, a gain controller 18, a duplexer 20, a radio frequency receiving unit 22, an intermediate frequency receiving unit 25, a frequency synthesizer 26, and a feedback unit 32. The indoor device 104 includes a service processing unit 11 and a modem (MODEM) 12.

In Embodiment 2, the outdoor device 102 and the indoor device 104 are connected to each other through an interface unit 13. For example, the interface unit 13 may include a multiplexer 132 located in the outdoor device 102 and a combiner interface unit 134 located in the indoor device 104. In addition, the function of the controller 28 in Embodiment 1 is cooperatively performed by a first controller 282 in the outdoor device 102 and a second controller 284 in the indoor device 104.

The first controller 282 is configured to control the gain controller 18 and the frequency synthesizer 26 to work. For example, the first controller 282 controls, according to a TR interval, the frequency synthesizer 26 to adjust a frequency of a third local oscillation signal, and controls, through the gain controller 18, the radio frequency transmitting unit 16 to increase a power of a signal output by the radio frequency transmitting unit 16.

The second controller 284 is configured to control a modem 12 to work. For example, the second controller 284 controls the modem 12 to adjust a modulation mode of the modem 12.

Various parameter values stored in the memory 30 in Embodiment 1 are stored in a first memory 302 in the outdoor device 102 and a second memory 304 in the indoor device 104 respectively. The first storage unit 302 stores the TR interval, and a rated maximum transmit power of the output signal of the radio frequency transmitting unit 16. The second storage unit 304 stores the modulation mode of the modem 12. The first storage unit 302 is connected to the first controller 282, and the second storage unit 304 is connected to the second controller 284.

Figure 3:
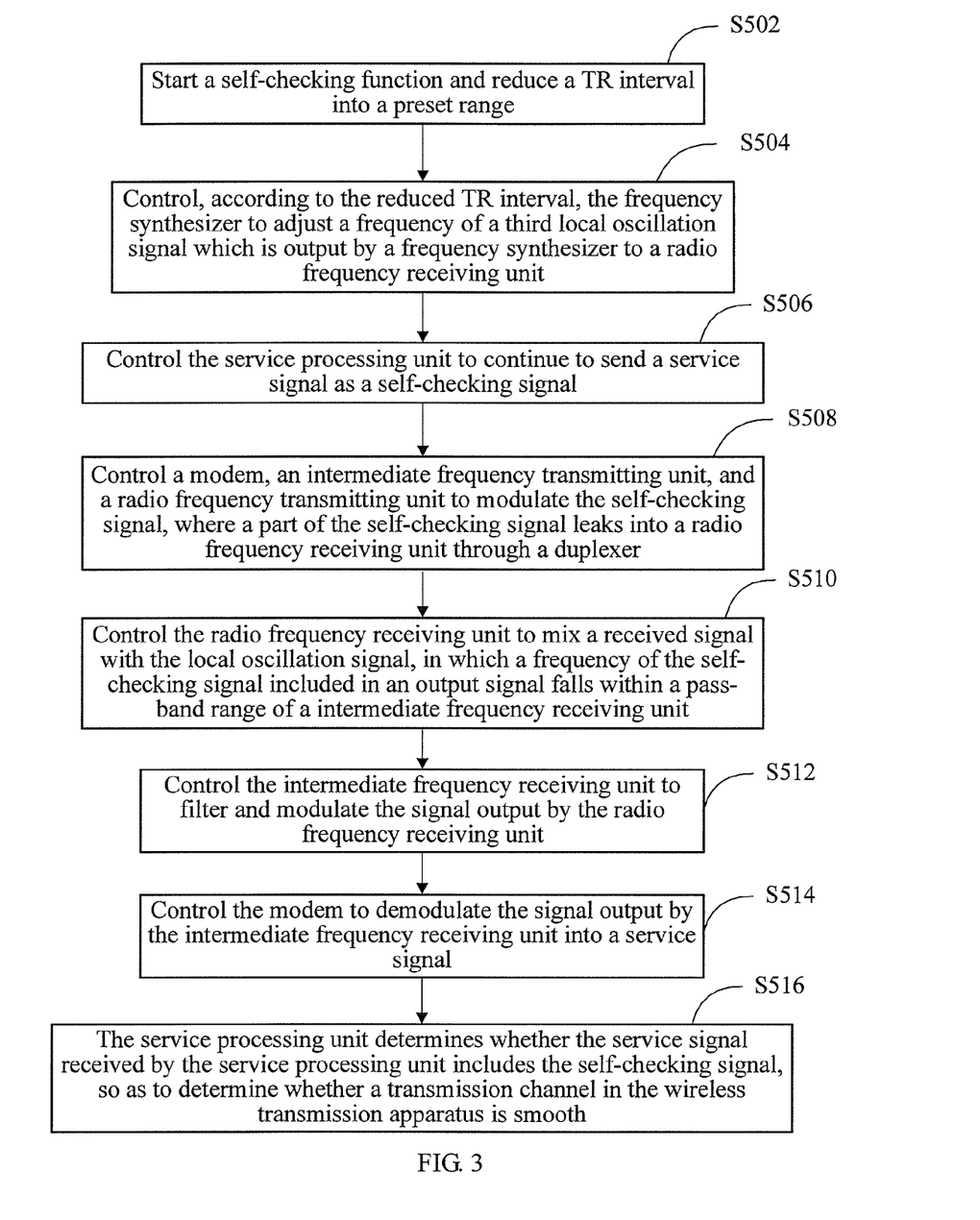
FIG. 3 is a flowchart of a self-checking method of a wireless transmission apparatus according to Embodiment 3 of the present invention.

As shown in FIG. 3, Embodiment 3 of the present invention further provides a self-checking method of a wireless transmission apparatus. The method includes:

S502: Start a self-checking function and reduce a TR interval into a preset range. Preferably, the preset range is from 0 to 10 KHz.

S504: Control, according to the reduced TR interval, a frequency synthesizer 26 to adjust a frequency of a third local oscillation signal which is output by a frequency synthesizer 26 to a radio frequency receiving unit. It should be noted that, a controller 28 cannot control, according to the reduced TR interval, a frequency synthesizer 26 to adjust frequencies of the first local oscillation signal and the second local oscillation signal.

S506: Control a service processing unit 11 to continue to send a service signal as a self-checking signal.

S508: Control a modem 12, an intermediate frequency transmitting unit 14, and a radio frequency transmitting unit 16 to modulate the self-checking signal, where after the self-checking signal is modulated into a radio frequency signal through the radio frequency transmitting unit 16, a part of the self-checking signal leaks into the radio frequency receiving unit 22 through a duplexer 20.

S510: Control the radio frequency receiving unit 22 to mix a received signal with the third local oscillation signal and output a second intermediate-to-high frequency signal, where a frequency of the self-checking signal included in the second intermediate-to-high frequency signal falls within a pass-band range of an intermediate frequency receiving unit 25, so that the self-checking signal may be transferred to the modem 12 through the intermediate frequency receiving unit 25.

It should be noted that, even if the signal received by the radio frequency receiving unit 22 includes a signal sent by a peer end, after the radio frequency receiving unit 22 mixes the received signal with the third local oscillation signal, the frequency of the signal sent by the peer end falls beyond the pass-band range of the intermediate frequency receiving unit 25, so that the signal sent by the peer end is filtered out by the intermediate frequency receiving unit 25, which avoids interference of the signal sent by the peer end with the self-checking signal.

S512: Control the intermediate frequency receiving unit 25 to filter and modulate the second intermediate-to-high frequency signal output by the radio frequency receiving unit 22 and output a second intermediate frequency signal.

S514: Control the modem 12 to demodulate the second intermediate frequency signal, which is output by the intermediate frequency receiving unit 22, into a service signal.

S516: The service processing unit 11 determines whether the service signal received by the service processing unit 11 includes the self-checking signal, and if the service processing unit 11 determines that the service signal received by the service processing unit 11 does not include the self-checking signal, it indicates that a transmission channel in the wireless transmission apparatus 100 is blocked, which reminds network management personnel to further check the specific cause of the fault; if the service processing unit 11 determines that the service signal received by the service processing unit 11 includes the self-checking signal, it indicates that the transmission channel in the wireless transmission apparatus 100 is unblocked, which reminds the network management personnel to further test whether a transmission channel and a communication link of the peer end are unblocked.

In addition, the service processing unit 11 may further determine whether a bit error rate of the self-checking signal received by the service processing unit 11 goes beyond a normal range, and if the service processing unit 11 determines that the bit error rate of the self-checking signal received by the service processing unit 11 goes beyond the normal range, it indicates that the transmission channel in the wireless transmission apparatus 100 is unblocked but faulty, which reminds the network management personnel to further check the specific cause of the fault; if the service processing unit 11 determines that the bit error rate of the self-checking signal received by the service processing unit 11 is in the normal range, it indicates that the transmission channel in the wireless transmission apparatus 100 is unblocked and faultless, which reminds the network management personnel to further test whether the transmission channel and the communication link of the peer end are faulty.

Moreover, the controller 28 may further control the modem 12 to be set in a modulation mode with a modulation order which is not higher than 7, such as, QPSK, 16QAM, or 64QAM, so as to satisfy the requirement of the modem 12 for the signal-to-noise ratio for signal demodulation.

Furthermore, the controller 28 may further control, through the gain controller 18, the radio frequency transmitting unit 16 to increase the power of the self-checking signal output by the radio frequency transmitting unit 16, for example, to increase the power of the self-checking signal to a rated maximum transmit power, so as to increase the difference between the power of the self-checking signal received by the modem 12 and the sensitivity of the modem 12, reduce the possibility of generating a residual bit error, and ensure that the modem 12 can correctly demodulate the self-checking signal.

In other embodiments, to ensure that the self-checking signal can be looped back to the service processing unit 11, persons skilled in the art can further configure other relevant parameters, such as, a frequency of the radio frequency signal, and a service bandwidth. The foregoing variation falls within the protection scope of the present invention.

The above descriptions are merely exemplary implementation manners of the present invention, but the protection scope of the present invention is not limited thereto. Variations or replacements figured out by persons skilled in the prior art within the technical scope of the present invention shall all fall within the protection scope of the present invention. Therefore, the protection scope of the present invention is subject to the appended claims.

What is claimed is:

1. A wireless transmission apparatus, comprising a service processing unit, a duplexer, a radio frequency receiving unit, a frequency synthesizer, and a controller, wherein:

the controller starts a self-checking function, reduces a frequency interval for receiving and transmitting signals into a preset range, and controls, according to the reduced frequency interval for receiving and transmitting signals, the frequency synthesizer to adjust a frequency of a local oscillation signal which is output by the frequency synthesizer to the radio frequency receiving unit;

the service processing unit continues to send a service signal as a self-checking signal, and after the self-checking signal is modulated into a radio frequency signal, a part of the self-checking signal leaks into the radio frequency receiving unit through the duplexer;

after the radio frequency receiving unit mixes a received signal with the local oscillation signal, a frequency of the self-checking signal comprised in an output signal falls within a pass-band range of an intermediate frequency receiving unit; and the service processing unit determines whether a service signal received by the service processing unit comprises the self-checking signal, and if the service processing unit determines that the service signal received by the service processing unit does not comprise the self-checking signal, then the service processing unit determines that a transmission channel in the wireless transmission apparatus is blocked; if the service processing unit determines that the service signal received by the service processing unit comprises the self-checking signal, then the service processing unit determines that the transmission channel in the wireless transmission apparatus is unblocked.

2. The wireless transmission apparatus according to claim 1, further comprising a modem, wherein the controller further controls the modem to be set in a modulation mode with a modulation order which is not higher than 7, demodulate the self-checking signal into the service signal according to the reset modulation mode, and send the service signal to the service processing unit.

3. The wireless transmission apparatus according to claim 1, further comprising a gain controller and a radio frequency transmitting unit, wherein the controller further controls, through the gain controller, the radio frequency transmitting unit to increase a power of the self-checking signal output by the radio frequency transmitting unit.

4. The wireless transmission apparatus according to claim 3, wherein the controller controls, through the gain controller, the radio frequency transmitting unit to increase the power of the self-checking signal, which is output by the radio frequency transmitting unit, to a rated maximum transmit power.

5. The wireless transmission apparatus according to claim 1, wherein if the service processing unit determines that the service signal received by the service processing unit comprises the self-checking signal, the service processing unit further determines whether a bit error rate of the self-checking signal received by the service processing unit goes beyond a normal range, and if the service processing unit determines that the bit error rate of the self-checking signal received by the service processing unit goes beyond the normal range, then the transmission channel in the wireless transmission apparatus is unblocked but faulty; if the service processing unit determines that the bit error rate of the self-checking signal received by the service processing is in the normal range, then the transmission channel in the wireless transmission apparatus is unblocked and faultless.

6. The wireless transmission apparatus according to claim 1, wherein the preset range is from 0 to 10 KHz.

7. A self-checking method of a wireless transmission apparatus, wherein the method comprises:
   starting a self-checking function and reducing a frequency interval for receiving and transmitting signals into a preset range;
   controlling, according to the reduced frequency interval for receiving and transmitting signals, a frequency synthesizer to adjust a frequency of a local oscillation signal which is output by the frequency synthesizer to a radio frequency receiving unit;
   controlling a service processing unit to continue to send a service signal as a self-checking signal;
   modulating the self-checking signal into a radio frequency signal, wherein a part of the self-checking signal leaks into the radio frequency receiving unit through a duplexer;
   controlling the radio frequency receiving unit to mix a received signal with the local oscillation signal, wherein a frequency of the self-checking signal comprised in an output signal falls within a pass-band range of an intermediate frequency receiving unit; and
   determining whether a received service signal comprises the self-checking signal, wherein if it is determined that the received service signal does not comprise the self-checking signal, then a transmission channel in the wireless transmission apparatus is blocked; if it is determined that the received service signal comprises the self-checking signal, then the transmission channel in the wireless transmission apparatus is unblocked.

8. The method according to claim 7, further comprising:
   controlling a modem to be set in a modulation mode with a modulation order which is not higher than 7, demodulate the self-checking signal into the service signal according to the reset modulation mode, and send the service signal to the service processing unit.

9. The method according to claim 7, further comprising: controlling, through a gain controller, a radio frequency transmitting unit to increase a power of the self-checking signal output by the radio frequency transmitting unit.

10. The method according to claim 9, wherein the radio frequency transmitting unit is controlled through the gain controller to increase the power of the self-checking signal, which is output by the radio frequency transmitting unit, to a rated maximum transmit power.

11. The method according to claim 7, wherein if it is determined that the received service signal comprises the self-checking signal, it is further determined whether a bit error rate of the received self-checking signal goes beyond a normal range, and if it is determined that the bit error rate of the received self-checking signal goes beyond the normal range, then the transmission channel in the wireless transmission apparatus is unblocked but faulty; if it is determined that the bit error rate of the received self-checking signal is in the normal range, then the transmission channel in the wireless transmission apparatus is unblocked and faultless.

12. The method according to claim 7, wherein the preset range is from 0 to 10 KHz.

* * * * *